US011733371B2

(12) United States Patent
You et al.

(10) Patent No.: US 11,733,371 B2
(45) Date of Patent: Aug. 22, 2023

(54) RADAR APPARATUS, METHOD FOR CONTROLLING RADAR APPARATUS AND DETECTION SYSTEM USING RADAR APPARATUS

(71) Applicant: HL KLEMOVE CORP., Incheon (KR)

(72) Inventors: Kyung Jin You, Anyang-si (KR); HaeSueng Lim, Yongin-si (KR)

(73) Assignee: HL KLEMOVE CORP., Incheon (KR)

( * ) Notice: Subject to any disclaimer, the term of this patent is extended or adjusted under 35 U.S.C. 154(b) by 603 days.

(21) Appl. No.: 16/811,164

(22) Filed: Mar. 6, 2020

(65) Prior Publication Data
US 2020/0284899 A1    Sep. 10, 2020

(30) Foreign Application Priority Data

Mar. 7, 2019 (KR) .................. 10-2019-0026427

(51) Int. Cl.
| | | |
|---|---|---|
| *G01S 13/87* | (2006.01) | |
| *G01S 13/931* | (2020.01) | |
| *G01S 13/28* | (2006.01) | |
| *G01S 13/00* | (2006.01) | |

(52) U.S. Cl.
CPC .......... *G01S 13/872* (2013.01); *G01S 13/006* (2013.01); *G01S 13/288* (2013.01); *G01S 13/931* (2013.01)

(58) Field of Classification Search
CPC ...... G01S 13/42; G01S 13/26; G01S 13/4463; G01S 13/288; G01S 13/872; G01S 13/006; G01S 13/931; G01S 2013/0245; G01S 7/023; G01S 7/354; G01S 7/2813; G01S 7/52047

USPC .......................... 342/70, 157, 107, 134, 127
See application file for complete search history.

(56) References Cited

U.S. PATENT DOCUMENTS

| | | | | |
|---|---|---|---|---|
| 3,185,981 A | * | 5/1965 | Bath ...................... | G01S 13/60 |
| | | | | 702/143 |
| 3,611,381 A | * | 10/1971 | Preikschat ............... | H01Q 3/42 |
| | | | | 342/370 |
| 4,042,931 A | * | 8/1977 | Gustafsson .......... | H01Q 3/2617 |
| | | | | 342/427 |

(Continued)

FOREIGN PATENT DOCUMENTS

| | | |
|---|---|---|
| JP | 5848944 B2 | 1/2016 |
| KR | 10-2015-0086072 A | 7/2015 |

*Primary Examiner* — Vladimir Magloire
*Assistant Examiner* — Michael W Justice
(74) *Attorney, Agent, or Firm* — Hauptman Ham, LLP

(57) ABSTRACT

The present disclosure provides a radar apparatus including: an antenna including a first transmitting antenna, a second transmitting antenna, and a receiving antenna; a transmitter including a first modulator for generating a first transmission signal having an inverted phase of a source signal and transmitting the first transmission signal through the first transmitting antenna, and a second modulator for generating a second transmission signal having a shifted phase of the source signal and transmitting the second transmission signal through the second transmitting antenna; a receiver for receiving a reflection signal of the first transmission signal and the second transmission signal reflected from the object through the receiving antenna; and a controller for obtaining information for the object based on the reflection signal. According to the present disclosure, it is possible to efficiently detect the object using the antenna having a simple structure.

20 Claims, 8 Drawing Sheets

(56) References Cited

U.S. PATENT DOCUMENTS

| | | | | |
|---|---|---|---|---|
| 4,213,133 A * | 7/1980 | Hidaka | H01Q 3/26 342/350 |
| 4,246,585 A * | 1/1981 | Mailloux | H01Q 3/38 343/754 |
| 4,520,362 A * | 5/1985 | Charlot | G01S 7/025 342/361 |
| 5,107,273 A * | 4/1992 | Roberts | G01S 7/2813 342/417 |
| 5,173,707 A * | 12/1992 | Mangiapane | G01S 13/90 342/149 |
| 5,781,845 A * | 7/1998 | Dybdal | H04B 7/0615 342/383 |
| 6,400,318 B1 | 6/2002 | Kasami | H01Q 3/2605 342/383 |
| 6,697,009 B2 * | 2/2004 | Yu | G01S 13/4409 342/149 |
| 6,768,444 B2 * | 7/2004 | Langsford | G01S 7/2813 342/19 |
| 7,006,039 B2 * | 2/2006 | Miyamoto | H04K 3/825 455/1 |
| 7,304,607 B2 * | 12/2007 | Miyamoto | H01Q 1/22 455/1 |
| 7,466,261 B1 * | 12/2008 | Hoctor | G01S 13/12 342/134 |
| 7,616,150 B1 * | 11/2009 | Woodell | G01S 7/2813 342/63 |
| 8,432,326 B2 * | 4/2013 | Rofougaran | H01Q 1/2283 343/777 |
| 8,596,587 B2 * | 12/2013 | Hilleary | G01S 13/87 246/111 |
| 8,766,864 B2 * | 7/2014 | Rofougaran | H01Q 13/20 343/777 |
| 9,019,145 B1 * | 4/2015 | Sishtla | G01S 13/953 342/26 B |
| 9,326,188 B1 * | 4/2016 | Oroskar | H04W 16/14 |
| 9,520,923 B2 * | 12/2016 | Singerl | H04B 1/0475 |
| 9,560,550 B1 * | 1/2017 | Oroskar | H04W 28/04 |
| 9,891,316 B2 * | 2/2018 | Mizutani | G01S 13/08 |
| 10,466,352 B2 * | 11/2019 | Huang | G01S 13/931 |
| 10,830,867 B2 * | 11/2020 | Lin | G01S 7/40 |
| 11,262,441 B2 * | 3/2022 | Yamanouchi | G01S 13/343 |
| 11,385,321 B2 * | 7/2022 | Lin | H01Q 3/36 |
| 2003/0085833 A1 * | 5/2003 | Yu | G01S 13/4463 342/380 |
| 2004/0027268 A1 * | 2/2004 | Langsford | G01S 7/2813 342/39 |
| 2005/0030226 A1 * | 2/2005 | Miyamoto | H01Q 3/2652 342/370 |
| 2006/0087385 A1 * | 4/2006 | Fitzpatrick | G01S 13/0209 333/117 |
| 2006/0238414 A1 * | 10/2006 | Miyamoto | H04K 3/825 342/370 |
| 2008/0316086 A1 * | 12/2008 | Hoctor | G01S 13/12 342/137 |
| 2010/0309079 A1 * | 12/2010 | Rofougaran | H01Q 13/20 343/777 |
| 2012/0286103 A1 * | 11/2012 | Hilleary | B61L 29/30 342/173 |
| 2013/0169471 A1 * | 7/2013 | Lynch | G01S 7/352 342/107 |
| 2013/0237163 A1 * | 9/2013 | Rofougaran | H01Q 13/22 343/777 |
| 2015/0362592 A1 * | 12/2015 | Mizutani | G01S 13/46 342/118 |
| 2016/0329935 A1 * | 11/2016 | Singerl | H04B 1/0475 |
| 2017/0041038 A1 * | 2/2017 | Kirkpatrick | H01Q 3/247 |
| 2017/0363734 A1 * | 12/2017 | Huang | G01S 13/42 |
| 2019/0056476 A1 * | 2/2019 | Lin | G01S 7/023 |
| 2019/0140344 A1 * | 5/2019 | Kirino | H01P 3/081 |
| 2019/0195985 A1 * | 6/2019 | Lin | G01S 13/931 |
| 2019/0265353 A1 * | 8/2019 | Jones | G01S 13/04 |
| 2021/0103043 A1 * | 4/2021 | Yamanouchi | G08G 1/166 |

\* cited by examiner

FIG.6

| frame | 1 | 2 | 3 | ... | n-1 | n |
|---|---|---|---|---|---|---|
| Tx1 Phase | 180° | 180° | 180° | ... | 180° | 180° |
| Tx2 Phase | -90° | -89° | -88° | ... | 89° | 90° |

RADAR APPARATUS, METHOD FOR CONTROLLING RADAR APPARATUS AND DETECTION SYSTEM USING RADAR APPARATUS

CROSS REFERENCE TO RELATED APPLICATION

This application claims priority from Korean Patent Application No. 10-2019-0026427, filed on Mar. 7, 2019, which is hereby incorporated by reference for all purposes as if fully set forth herein.

BACKGROUND OF THE INVENTION

1. Field of the Invention

The present disclosure relates to a radar apparatus for detecting an object, a control method of the radar apparatus, and a detection system using the radar apparatus.

2. Description of the Prior Art

A radar device is an apparatus for detecting the distance to the target, the direction of the target, and information about the target by transmitting electromagnetic waves to the target at a remote location, receiving and analyzing reflection waves reflected from the target.

The application range of the radar device is very wide. For example, autonomous driving vehicles may include the radar device or radar sensor to perform advanced driver assistance system (ADAS), autonomous emergency braking (AEB) systems and so on.

In order for the radar device to accurately detect remote targets, it is very important to obtain the maximum gain by adjusting the beam width of the antenna included in the radar device. In this case, the gain of the antenna increases as the number of antennas increases, thereby increasing the technical requirements, which may cause the problems regarding the cost and installation space.

Therefore, there is an increasing need for a radar device capable of efficiently detecting an object using an antenna having a simpler structure.

SUMMARY OF THE INVENTION

For this background, an object of the present disclosure is to provide a radar apparatus and a radar apparatus control method capable of efficiently detecting the object using an antenna having a simple structure by acquiring the position information of the object by using the null position indicated in the radiation pattern of the array antenna.

Another object of the present disclosure to provide a detection system using a radar apparatus capable of detecting an object more efficiently by controlling the null to be appeared for the area except the area detected by other sensors provided in the vehicle.

In accordance with an aspect of the present disclosure, there is provided a radar apparatus comprising: an antenna including a first transmitting antenna, a second transmitting antenna, and a receiving antenna; a transmitter including a first modulator for generating a first transmission signal having an inverted phase of a source signal and transmitting the first transmission signal through the first transmitting antenna, and a second modulator for generating a second transmission signal having a shifted phase of the source signal and transmitting the second transmission signal through the second transmitting antenna; a receiver for receiving a reflection signal in which the first transmission signal and the second transmission signal are reflected from the object through the receiving antenna; and a controller for obtaining information for the object based on the reflection signal.

In accordance with another aspect of the present disclosure, there is provided a control method of a radar apparatus comprising: transmitting a first transmission signal generated by inverting a phase of a source signal through a first transmitting antenna; transmitting a second transmission signal generated by shifting the phase of the source signal through a second transmitting antenna; receiving a reflection signal in which the first transmission signal and the second transmission signal are reflected from an object through a receiving antenna; and acquiring information for the object based on the reflected signal.

In accordance with another aspect of the present disclosure, there is provided a detection system provided in a vehicle comprising: at least one sensor for sensing a perimeter of the vehicle; and a radar apparatus for transmitting a first transmission signal generated by inverting a phase of a source signal in order for a radiation pattern formed by the first transmission signal and a second transmission signal to include at least one null, transmitting a second transmission signal generated by shifting the phase of the source signal by changing a phase shift value at a predetermined time interval, receiving the reflection signal in which the first transmission signal and the second transmission signal are reflected by an object, and acquiring position information of the object according to a position change of the null and whether the object is detected, wherein the radar apparatus shifts the phase of the second transmission signal so that the null appears for an area except an area detected by the at least one sensor.

According to the present disclosure, it is possible to provide a radar device, a radar device control method capable of efficiently detecting the object using a simple antenna by obtaining the position information of the object by using the position of the null appearing in the radiation pattern of the array antenna.

According to the present disclosure, it is possible to provide a detection system using a radar device capable of detecting an object more efficiently by controlling the null to appear in an area excluding an area detected by another sensor provided in the vehicle.

BRIEF DESCRIPTION OF THE DRAWINGS

FIGS. 2 to 6 are diagrams for explaining the operation of the radar apparatus according to the present disclosure;

DETAILED DESCRIPTION OF THE EXEMPLARY EMBODIMENTS

Figure 1:
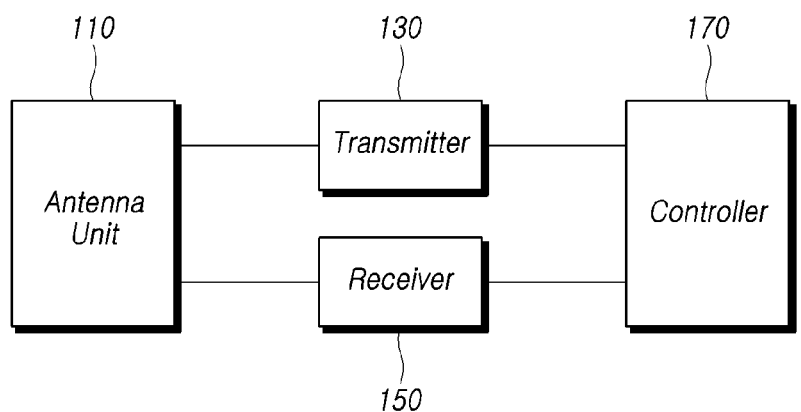
FIG. 1 is a block diagram of a radar apparatus according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, embodiments of the radar apparatus, the control method of the radar apparatus and the detection system using the radar apparatus according to the present disclosure will be described with reference to exemplary diagrams.

FIG. 1 is a block diagram of a radar apparatus according to the present disclosure, and FIGS. 2 to 6 are diagrams for explaining the operation of the radar apparatus according to the present disclosure.

Referring to FIG. 1, the radar apparatus 100 according to the present disclosure includes an antenna unit 110 including a first transmitting antenna, the second transmitting antenna and the receiving antenna, a transmitter 130 including a first modulator for generating a first transmission signal having an inverted phase of a source signal and transmitting the first transmission signal through a first transmitting antenna and a second modulator for generating a second transmission signal having a phase shifted from a source signal and transmitting the second transmission signal through the second transmitting antenna, a receiver 150 for receiving the reflection signal in which the first transmission signal and the second transmission signal are reflected by the object through the receiving antenna, and a controller 170 for obtaining information for the object based on the reflection signal.

According to one embodiment, the radar apparatus 100 may be mounted on the vehicle body of the vehicle. The radar apparatus 100 may be installed at the front, rear, or side of the vehicle as required by the control system of the vehicle to be used to detect the object around the vehicle.

The antenna unit 110 may include the first transmitting antenna as an array antenna through which the first transmission signal is transmitted, and the second transmitting antenna as an array antenna through which the second transmission signal is transmitted. The first transmitting antenna and the second transmitting antenna may have substantially the same shape and characteristics.

The first transmitting antenna and the second transmitting antenna included in the antenna unit 110 may be spaced apart by a predetermined distance. The antenna unit 110 may include the receiving antenna that receives the reflection signal reflected from the object by the first transmission signal and the second transmission signal. The object may be an object such as a person, a vehicle or a structure such as a guard rail located in front of the radar device. The receiving antenna may be not limited to a specific antenna as long as it can receive the reflection signal.

The transmitter 130 may generate the first transmission signal having the inverted phase of the source signal by shifting the phase of the source signal by 180 degrees. If the first transmission signal having the inverted phase is transmitted through the first transmitting antenna, at least one null may appear on an array factor which is a radiation pattern of the first transmission signal and the second transmission signal.

The transmitter 130 may generate the second transmission signal in which the phase of the source signal is shifted by a predetermined angle φ. The transmitter 130 may change the value of φ at predetermined time intervals. The transmitter 130 may transmit the generated second transmission signal through the second transmitting antenna. In the case that the second transmission signal shifted by the changed φ at predetermined time intervals is transmitted, the position of the null on the array factor may be changed according to the φ value.

The receiver 150 may receive a reflection signal returned from the object among the transmission signal transmitted by the transmitter 130 through the receiving antenna. The receiver 150 may transfer the received reflection signal to the controller 170.

The controller 170 may control the overall operation of the radar apparatus 100. According to an example, the controller 170 may convert the reflection signal received from the receiver 150 into a digital signal. The controller 170 may acquire information about the presence and location of the object based on the reflection signal. The controller 170 may transmit the obtained information to the detection system using the radar apparatus 100.

Hereinafter, the operation of the radar apparatus 100 will be described in more detail with reference to the accompanying drawings.

Figure 2:
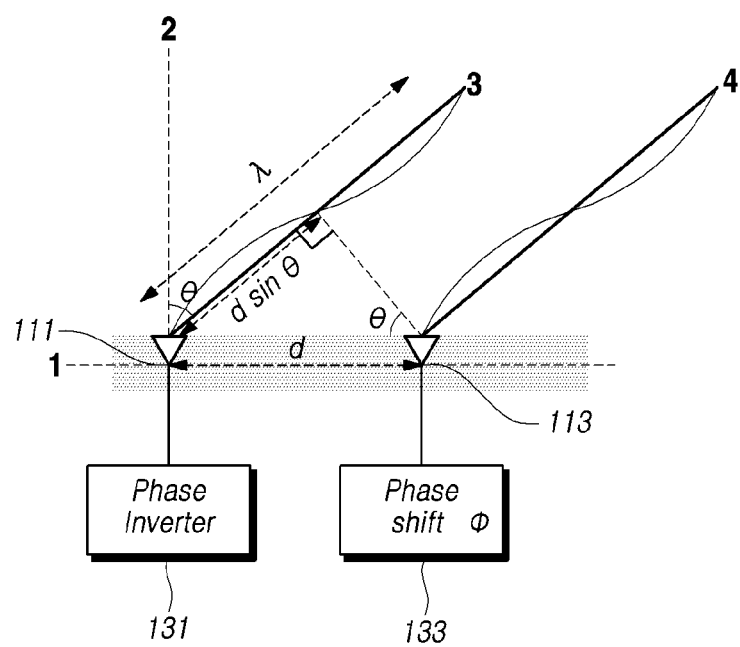

Referring to FIG. 2, the first transmitting antenna 111 and the second transmitting antenna 113 may be arranged such that the separation distance between the antennas is d. Radiation directions 3 and 4 of the transmission signal may be formed at an angle θ with respect to the axis 2 perpendicular to the array axis 1 of the antenna. According to an example, the separation distance d between the first transmitting antenna and the second transmitting antenna may be determined based on the wavelength λ of the first transmission signal and the second transmission signal.

For example, the separation distance d may be determined as half of the wavelength of the first transmission signal or the second transmission signal. According to an example, since the first transmission signal and the second transmission signal are inverted or shifted in phase with respect to the same source signal, the wavelengths are the same. Accordingly, the separation distance d may be determined even if the separation distance d is determined based on either the wavelength of the first transmission signal or the wavelength of the second transmission signal. However, this is only an example, and the present disclosure is not limited thereto, and the separation distance d may be determined differently as necessary.

Referring to FIG. 2, the first modulator 131 and the second modulator 133 included in the transmitter 130 are illustrated. The first modulator 131 may generate the first transmission signal in which the phase of the source signal is inverted and may transmit the first transmission signal through the first transmitting antenna. According to an example, the first modulator 131 may be implemented as a hardware module that may or may not invert the phase of the source signal. In the case that the phase of the source signal can be inverted, the first modulator 131 is not limited to specific hardware. For example, the hardware module may be a coupler in which an input port of a source signal and an output port to the first transmitting antenna are separated by half a wavelength, a phase shifter, an I/Q modulator, and the like. That is, the physical rotator such as the hybrid coupler capable of inverting the phase of the source signal and providing the same to the transmitting antenna may be configured as the hardware module. Alternatively, various known phase shifters for inverting phase may be configured as hardware modules. Alternatively, a hardware module that inverts the phase may be configured through an I/Q modulator having an in phase (I) and a quadrature (Q) channel. However, this is an example and the present invention is not limited thereto. The first modulator 131 may be replaced with a software module that performs substantially the same operation as the hardware module.

The second modulator 133 may generate the second transmission signal having a phase shifted from the source signal, and transmit the second transmission signal through the second transmitting antenna. According to an example, the second modulator 133 may be implemented as a hardware module capable of shifting the phase of the source signal to at least two types. If the phase of the source signal can be shifted, the second modulator 133 is not limited to specific hardware. However, this is merely an example and the present disclosure is not limited thereto. The second modulator 133 may be replaced with a software module that performs substantially the same operation as the hardware module.

In this case, as shown in Equation 1 below, the synthesized electric field by the first transmitting antenna 111 and the second transmitting antenna 113 may be expressed as a product of the electric field E0(θ) by one antenna and an array factor F(θ, φ) which is a radiation pattern of the transmission signal and the second transmission signal.

$$E(\theta,\phi) = E_0(\theta) \cdot F(\theta,\phi)$$ [Equation 1]

Here, θ is an angle formed between the axis 2 perpendicular to the array axis 1 of the antenna and the radiation directions 3 and 4 of the transmission signal, and φ may mean a shift value or a transition value of the phase of the source signal for generating the second transmission signal.

Here, the condition of the antenna for determining the electric field E0(θ) by one antenna is not limited to a specific condition. However, since the present disclosure is characterized in that it is possible to efficiently detect the object while reducing the cost by using a simple structure of the antenna and to utilize position of the null on the array factor for this purpose, it may be preferable to be implemented with an antenna having a relatively wide beam-width electric field.

According to an example, the separation distance d between the first transmitting antenna 111 and the second transmitting antenna 113 may be set to half of the wavelength λ of the first transmission signal and the second transmission signal. The phases of the first transmission signal and the second transmission signal may be signals whose phases are only changed based on the same source signal, and the array factor of the first transmission signal and the second transmission signal may be expressed by Equation 2 below.

$$F(\theta, \phi) = \frac{1}{2}\exp\{j\pi\sin\theta\} \cdot \exp\{-j\pi\sin\phi\} - \frac{1}{2}$$ [Equation 2]
$$= \frac{1}{2}\exp\{j\pi(\sin\theta - \sin\phi)\} - \frac{1}{2}$$

Figure 3:
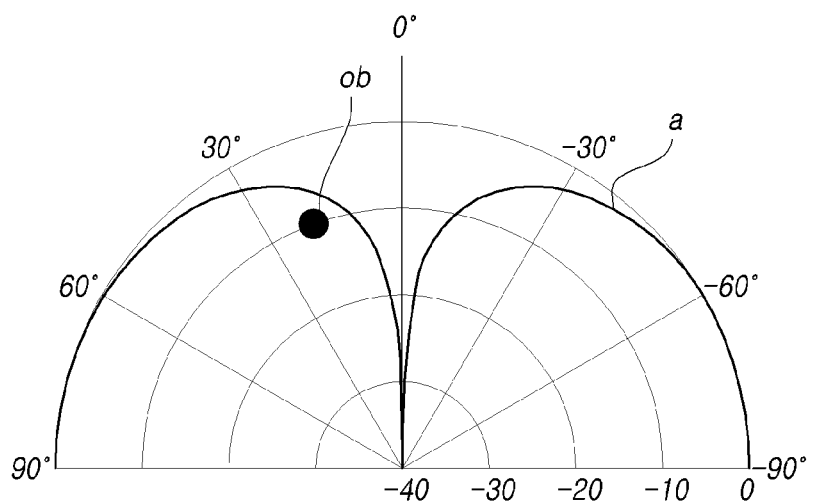

Referring to FIG. 3, the array factor (a) is shown by the solid line, in which the array factor (a) is calculated when the phase shift angle φ of the second transmission signal is 0° and the angle θ in the transmission direction of the first transmission signal and the second transmission signal is in the range of −180° to +180°.

Figure 4:
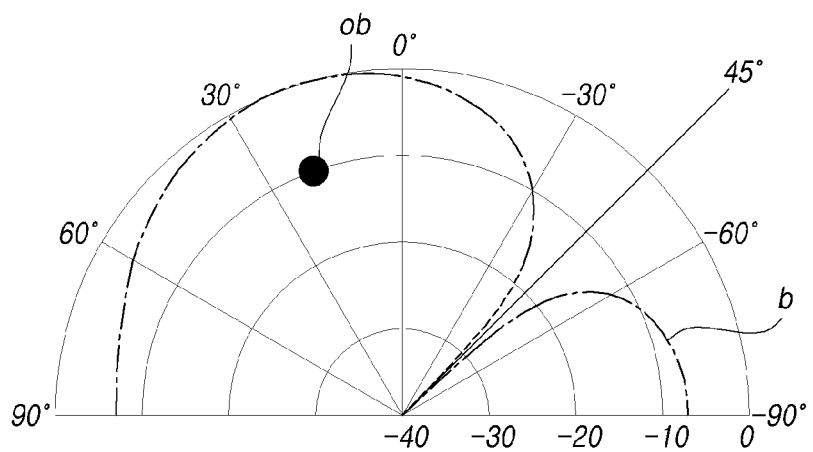

Referring to FIG. 4, the array factor (b) is shown by the dashed-dotted line, in which the array factor (b) is calculated when the phase shift angle φ of the second transmission signal is −45° and the angle θ in the transmission direction of the first transmission signal and the second transmission signal is in the range of −180° to +180°. Similarly, since the value of the synthesized electric field may be 0 in −45° which is the transmission direction where θ equals φ, a null may be formed in the −45° direction. In this case, the presence of the object ob may be detected by the radar apparatus 100. However, similarly, since the beam width is wide, the exact position of the object ob may not be confirmed.

Figure 5:
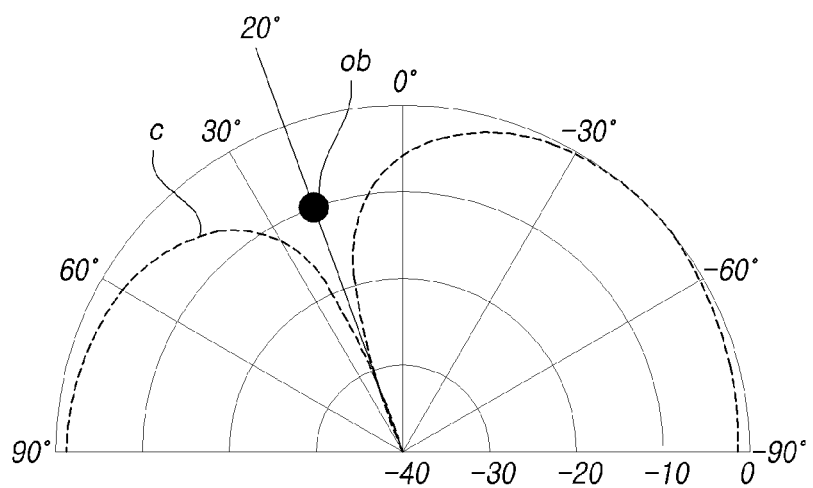

Referring to FIG. 5, the array factor (c) is shown by the dashed line, in which the array factor (c) is calculated when the phase shift angle φ of the second transmission signal is +20° and the angle θ in the transmission direction of the first transmission signal and the second transmission signal is in the range of −180° to +180°. Similarly, since the value of the synthesized electric field may be 0 in +20° which is the transmission direction where θ equals φ, a null may be formed in the +20° direction. In this case, since the object ob is in the null position as shown in FIG. 5, the object ob is not detected by the radar apparatus 100.

Thai is, in the case that φ, the phase shift angle, is changed at predetermined time intervals, the angle at which nulls are generated may be changed in accordance with φ. By using this characteristic, the object ob may not be detected by the radar apparatus 100 only when the null is formed around +20° among array factors changed at predetermined time intervals.

In this case, the controller 170 may determine that the object ob exists near +20° where the object ob is not detected. Therefore, position information of the object ob may be obtained. That is, the directivity of the null may be changed through phase modulation of the transmission signal, and accurate position information of the object may be obtained by using the opposite of the fact that the object is not detected at the position where the null appears.

In addition, if φ is continuously modulated by a small angle, the controller 170 may obtain an approximate size information of the object ob by calculating an angle range in which the object ob is not detected.

According to an example, the predetermined time interval may be required to be appropriately set assuming the maximum moving speed of the object ob. That is, since the object ob may move out of the detectable area of the radar apparatus 100 and may not be detected, the predetermined time interval may be set at an appropriate time interval to prevent such an error.

Meanwhile, if necessary, the transmitter 130 may control the phase shift value of the second transmission signal to be changed in the predetermined detection area. For example, the predetermined detection area may be set not to overlap with the detection area of other sensor in the vehicle.

In one embodiment, the radar apparatus 100 may determine the area overlapping with the area detected by the other sensor 200 based on a changeable range of φ, which is a shift angle or a transition angle with respect to the phase of the second transmission signal. The radar apparatus 100 may change φ so that nulls appear in the area except for the area overlapping with the detection area of other sensor. For example, assume that the changeable range for the phase of the second transmission signal is from −90° to +90°. If the other sensor 200 is able to detect −90° to −45° of the changeable range, the transmitter 130 may be controlled such that the phase shift value φ of the second transmission signal is changed from −45° to +90°.

Accordingly, the object can be detected more efficiently by controlling the null to appear in the area except the area detected by other sensor provided in the vehicle.

Referring to FIG. 6, according to one embodiment, a phase modulation (Tx1 Phase) value of the first transmission signal and a phase modulation (Tx2 Phase) value of the second transmission signal are shown for the predetermined time frame. That is, the first transmission signal may be maintained in a state shifted by 180° in every time interval to invert the phase of the source signal. The second transmission signal may be transmitted according to the shift value that is changed by 1° from −90° to +90° every time interval. In this case, the position of the null in the array factor may appear to move sequentially from −90° to +90°, thus it may be form of scanning for the front area (−90° to +90°) of the radar apparatus 100.

However, this is merely an example and the present disclosure is not limited thereto. On the premise that the radar apparatus 100 is installed on the vehicle body and detects the front, the changeable range of φ has been described as having the range of −90° to +90°, however φ may be set to different ranges as necessary.

Furthermore, as shown in FIG. 6, φ does not need to be continuously changed by 1° every time interval, and may be set to have a specific value in each time interval according to a predetermined condition. For example, φ may be randomly changed at every time interval according to an initial condition, and if the object ob is detected, thereafter, the φ may be set to be continuously changed around an angle at which the object ob is not initially detected.

Accordingly, the position information of the object may be obtained by using the position of the null appearing in the radiation pattern of the array antenna, thereby it is possible to effectively detect the position of the object by using the antenna of a simple structure without a high cost antenna for sharply adjusting the beam width of the array antenna.

Figure 7:
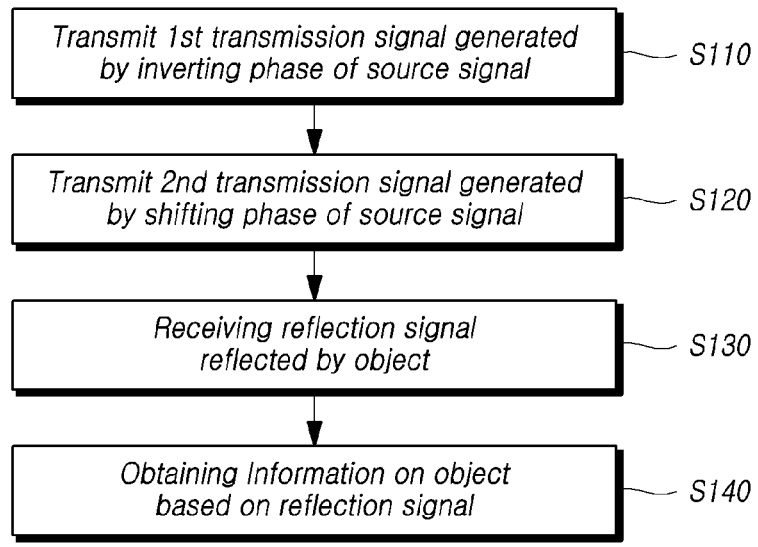
FIG. 7 is a flowchart illustrating a control method of the radar apparatus according to the present disclosure.

FIG. 7 is a flowchart illustrating the control method of the radar apparatus according to the present disclosure.

The control method of the radar apparatus according to the present disclosure may be implemented in the radar apparatus 100 described with reference to FIG. 1. Hereinafter, the method of controlling the radar apparatus and the operation of the radar apparatus 100 for implementing the same will be described in detail with reference to the accompanying drawings.

Referring to FIG. 7, the radar apparatus may transmit the first transmission signal generated by inverting the phase of the source signal through the first transmitting antenna (S110).

The radar apparatus may generate the first transmission signal in which the phase is inverted by shifting the phase of the source signal by 180 degrees. If the first transmission signal having the inverted phase is transmitted through the first transmitting antenna, at least one null may appear on the array factor which is the radiation pattern of the first transmission signal and the second transmission signal.

Referring back to FIG. 7, the radar apparatus may transmit the second transmission signal generated by shifting the phase of the source signal through the second transmitting antenna (S120).

The radar device may generate the second transmission signal in which the phase of the source signal is shifted by the predetermined angle φ. The radar apparatus may change the value of φ at predetermined time intervals. The radar apparatus may transmit the generated second transmission signal through the second transmitting antenna. IF the second transmission signal phase-shifted by the changed φ at predetermined time intervals is transmitted, the position of the null on the array factor may be changed according to the φ value.

In FIG. 7, steps S110 and S120 are illustrated as being sequentially performed, but steps S110 and S120 may be performed substantially simultaneously.

Referring back to FIG. 7, the radar apparatus may receive the reflection signal of the first transmission signal and the second transmission signal reflected from an object through the receiving antenna (S130).

The radar apparatus may receive the reflection signal, which is reflected back from the transmitted transmission signal, through the receiving antenna. The radar apparatus may perform processes such as digital conversion on the received reflection signal.

Referring back to FIG. 7, the radar apparatus may obtain information about the object based on the reflection signal (S140).

If the phase shift angle φ is changed at predetermined time intervals, the angle at which nulls appear may be changed in accordance with φ. Using this characteristic, the object is not detected by the radar apparatus only if the null is formed near the object in the array factor which is changed at predetermined time intervals.

In the meantime, in the second signal transmission step, the phase shift value for the second transmission signal may be controlled to be changed in the specific detection area. For example, the specific detection area may be set not to overlap with the detection area of the other sensor in the vehicle.

In an embodiment, the radar apparatus 100 may determine an area overlapping with an area detected by the other sensor 200 based on the changeable range of φ, which is the shift angle with respect to the phase of the second transmission signal. The radar apparatus 100 may change φ so that nulls appear in an area except for the overlapping area. For example, assume that the changeable range for the phase of the second transmission signal is from −90° to +90°. If the other sensor 200 is able to detect the range of −90° to −45° among the changeable range, the transmitter 130 may control the phase shift value φ of the second transmission signal to be changed from −45° to +90°.

Accordingly, the object can be detected more efficiently by controlling the null to appear in the area except the area detected by the other sensor provided in the vehicle.

Therefore, the radar apparatus may determine that the object exists near the angle at which the object is not detected thereby the location information of the object may be obtained. That is, the directivity of the null may be changed through phase modulation of the transmission signal, and accurate position information of the object may be obtained by using the opposite of the fact that the object is not detected at the position where the null appears.

As a result, it is possible to efficiently detect the object using the antenna of a simple structure by obtaining the position information of the object using the position of the null appearing in the radiation pattern of the array antenna.

Figure 8:
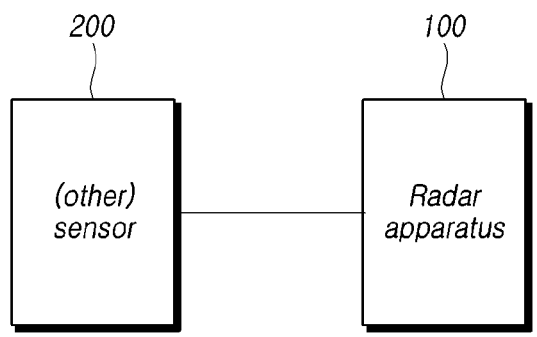
FIG. 8 is a block diagram of a detection system using the radar apparatus according to the present disclosure.

FIG. 8 is a block diagram of a detection system using the radar apparatus according to the present disclosure.

The detection system 10 using the radar apparatus may include at least one sensor 200 for detecting the surroundings of a vehicle, and the radar apparatus 100 for transmitting the first transmission signal in which the phase of the source signal is inverted such that the array factor which is the radiation pattern by the first transmission signal and the second transmission signal includes at least one null, transmitting the second transmission signal shifted in phase of the source signal by changing the phase shift value at predetermined time intervals, receiving the reflection signal of the first transmission signal and the second transmission signal reflected from the object, and obtaining the position information of the object by using the change in the position of the null indicated in the reflection signal.

The sensor 200 may include a camera, a lidar, an ultrasonic sensor, or another radar sensor used in various control systems for the vehicle. Each sensor 200 may be set to detect a predetermined area as needed. For example, the radar applied to the rear collision detection system may be set to detect the area for the rear-side of the vehicle. According to an example, information about the area detected by each sensor 200 may be transmitted to the controller of the radar apparatus 100 or may be stored in a memory or the like.

The radar apparatus 100 may be implemented using the configuration described with reference to FIGS. 1 to 7, and detailed descriptions thereof will be omitted in order to avoid duplication.

According to an exemplary embodiment, the radar apparatus 100 may determine the area overlapping with the area detected by each sensor 200 based on the changeable range of φ, which is the shift angle with respect to the phase of the second transmission signal. The radar apparatus 100 may change φ so that nulls appear in the area except for the overlapping area.

For example, assume that the changeable range for the phase of the second transmission signal is from −90° to +90°. If the other sensor 200 can detect from −90° to −45° of the changeable range, the radar apparatus 100 may control the φ to be changed from −45° to +90°.

According to the embodiments of the present disclosure, the null may be controlled to appear in the area except for the area detected by the other sensor provided in the vehicle, thereby the object can be detected more efficiently.

The present disclosure described above can be embodied as computer readable codes on a medium in which a computer program is recorded. The computer readable medium includes all kinds of recording devices in which data that can be read by a computer system is stored. Examples of computer-readable media include hard disk drives (HDDs), solid state disks (SSDs), silicon disk drives (SDDs), ROMs, RAM, CD-ROMs, magnetic tapes, floppy disks, optical data storage devices, and the like. This also includes those implemented in the form of carrier waves (eg, transmission over the Internet).

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar apparatus comprising:
an antenna including a first transmitting antenna, a second transmitting antenna, and a receiving antenna;
a transmitter including
a first modulator configured to generate a first transmission signal in which the phase of a source signal is inverted and transmit the first transmission signal through the first transmitting antenna, and
a second modulator configured to generate a second transmission signal in which the phase of the source signal is shifted and transmit the second transmission signal through the second transmitting antenna, a phase shift value of the second transmission signal having values other than 0° and 180°;
a receiver configured to receive, through the receiving antenna, a reflection signal from which the first transmit signal and the second transmit signal are reflected from an object; and
a controller configured to obtain information on the object based on the reflection signal,
wherein a radiation pattern generated by the first transmission signal and the second transmission signal includes at least one null, and
wherein the transmitter is configured to change a phase shift value for the second transmission signal at predetermined time intervals so as for the at least one null to appear in the area except for the area detected by the other sensor provided in a vehicle.

2. The radar apparatus of claim 1, wherein the first transmitting antenna and the second transmitting antenna are spaced apart by a distance determined based on the wavelength of the first transmission signal and the second transmission signal.

3. The radar apparatus of claim 1, wherein the transmitter performs phase inversion so that the radiation pattern generated by the first transmission signal and the second transmission signal includes the at least one null.

4. The radar apparatus of claim 3, wherein the transmitter changes the position at which the null appears by changing the phase shift value for the second transmission signal at predetermined time intervals.

5. The radar apparatus of claim 4, wherein the controller obtains position information on the object according to the change of the position of the null and whether the object is detected based on the reflection signal.

6. The radar apparatus of claim 4, wherein the transmitter changes the position within a predetermined detection area.

7. The radar apparatus of claim 6, wherein the predetermined detection area is determined other than a detection area of another sensor.

8. The radar apparatus of claim 1, wherein the first modulator is implemented as either a hardware module capable of inverting the phase of the source signal or a software module capable of performing the same operation as the hardware module.

9. The radar apparatus of claim 8, wherein the hardware module is at least one of a coupler in which an input port of the source signal and an output port to the first transmitting antenna are separated by half a wavelength, a phase shifter, or an I/Q modulator.

10. The radar apparatus of claim 1, wherein the second modulator is implemented as either a hardware module capable of shifting the phase of the source signal or a software module capable of performing the same operation as the hardware module.

11. A method for controlling a radar apparatus comprising:
generating a first transmission signal by inverting a phase of a source signal and transmitting the first transmission signal through a first transmitting antenna;
generating a second transmission signal by shifting the phase of the source signal and transmitting the second transmission signal through a second transmitting antenna, a phase shift value of the second transmission signal having values other than 0° and 180°;
receiving, through a receiving antenna, a reflection signal from which the first transmission signal and the second transmission signal are reflected from an object; and
acquiring information on the object based on the received reflection signal,
wherein a radiation pattern generated by the first transmission signal and the second transmission signal includes at least one null, and
wherein generating a second transmission signal comprises changing a phase shift value for the second transmission signal at predetermined time intervals so as for the at least one null to appear in the area except for the area detected by the other sensor provided in a vehicle.

12. The method for controlling a radar apparatus of claim 11, wherein transmitting the first transmission signal comprises performing a phase inversion such that the radiation pattern generated by the first transmission signal and the second transmission signal includes the at least one null.

13. The method for controlling a radar apparatus of claim 12, wherein transmitting the second transmission signal comprises changing a position at which the null appears by changing the phase shift value for the second transmission signal at predetermined time intervals.

14. The method for controlling a radar apparatus of claim 13, wherein acquiring information on the object comprises obtaining position information on the object according to the change of the position of the null and whether the object is detected based on the reflection signal.

15. The method for controlling a radar apparatus of claim 13, wherein transmitting the second transmission signal comprises controlling the phase shift value of the second transmission signal so that the position is changed within a predetermined detection area.

16. The method for controlling a radar apparatus of claim 15, wherein the predetermined detection area is determined other than a detection area of another sensor.

17. A detection system provided in a vehicle comprising:
at least one sensor configured to sense an object on the periphery of the vehicle; and
a radar apparatus including
an antenna including a first transmitting antenna, a second transmitting antenna, and a receiving antenna,
a transmitter including
a first modulator configured to generate a first transmission signal in which the phase of a source signal is inverted and transmit the first transmission signal through the first transmitting antenna, and
a second modulator configured to generate a second transmission signal in which the phase of the source signal is shifted and transmit the second transmission signal through the second transmitting antenna, a phase shift value of the second transmission signal having values other than 0° and 180°,
wherein a radiation pattern generated by the first transmission signal and the second transmission signal includes at least one null,
a receiver configured to receive, through the receiving antenna, a reflection signal from which the first transmit signal and the second transmit signal are reflected from an object; and
a controller configured to acquire, based on the received reflection signal, positon information on the object according to a position change of the at least one null and whether the object is detected, and
wherein the transmitter is configured to change a phase shift value for the second transmission signal at predetermined time intervals so as for the at least one null to appear in the area except for the area detected by the other sensor provided in a vehicle.

18. The detection system of claim 17, wherein the transmitter of the radar apparatus changes the position at which the null appears by changing the phase shift value for the second transmission signal at predetermined time intervals.

19. The detection system of claim 18, wherein the transmitter of the radar apparatus changes the position within a predetermined detection area.

20. The detection system of claim 19, wherein the predetermined detection area is determined other than a detection area of the at least one sensor.

* * * * *